US006454008B1

(12) United States Patent
Chatterji et al.

(10) Patent No.: US 6,454,008 B1
(45) Date of Patent: Sep. 24, 2002

(54) FOAMED FRACTURING FLUIDS, ADDITIVES AND METHODS OF FRACTURING SUBTERRANEAN ZONES

(75) Inventors: Jiten Chatterji; Ron Crook; Karen L. King, all of Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/094,042

(22) Filed: Mar. 8, 2002

Related U.S. Application Data

(63) Continuation-in-part of application No. 09/696,902, filed on Oct. 25, 2000, now Pat. No. 6,367,550.

(51) Int. Cl.$^7$ .................. E21B 43/26; E21B 43/267
(52) U.S. Cl. .................. 166/308; 166/309; 507/202; 507/922; 507/924
(58) Field of Search ............... 166/280, 300, 166/308, 309; 507/202, 269, 922, 924

(56) References Cited

U.S. PATENT DOCUMENTS

| | | | |
|---|---|---|---|
| 3,926,650 A | 12/1975 | Lange et al. | |
| 4,020,903 A * | 5/1977 | Fielding et al. | 169/47 |
| 4,524,829 A * | 6/1985 | Hanlon et al. | 466/294 |
| 5,067,565 A * | 11/1991 | Holtmyer et al. | 166/308 X |
| 5,133,409 A | 7/1992 | Bour et al. | 166/293 |
| 5,147,565 A | 9/1992 | Bour et al. | |
| 5,335,726 A * | 8/1994 | Rodrigues | 166/295 |
| 5,569,324 A | 10/1996 | Totten et al. | 106/696 |
| 5,580,378 A | 12/1996 | Shulman | 106/677 |
| 5,588,489 A | 12/1996 | Chatterji et al. | 166/293 |
| 5,696,059 A | 12/1997 | Onan et al. | 507/269 |
| 5,711,376 A * | 1/1998 | Sydansk | 166/308 |
| 5,711,801 A | 1/1998 | Chatterji et al. | 106/789 |
| 5,897,699 A | 4/1999 | Chatterji et al. | 106/678 |
| 5,990,052 A * | 11/1999 | Harris | 166/308 X |
| 6,063,738 A | 5/2000 | Chatterji et al. | 507/269 |
| 6,085,844 A * | 7/2000 | Palmer et al. | 166/312 |
| 6,196,317 B1 * | 3/2001 | Hardy | 166/300 X |
| 6,367,550 B1 * | 4/2002 | Chatterji et al. | 166/309 X |

* cited by examiner

*Primary Examiner*—George Suchfield
(74) *Attorney, Agent, or Firm*—Robert A. Kent; C. Clark Dougherty, Jr.

(57) ABSTRACT

The present invention provides environmentally safe foamed fracturing fluids, additives for foaming and stabilizing foamed fracturing fluids and methods of fracturing subterranean zones. The foamed fracturing fluids of this invention are basically comprised of water, a gelling agent for forming the water into gelled water and increasing the viscosity thereof, sufficient gas to form a foam, and an effective amount of an additive for foaming and stabilizing the gelled water comprised of hydrolyzed keratin.

17 Claims, No Drawings

FOAMED FRACTURING FLUIDS, ADDITIVES AND METHODS OF FRACTURING SUBTERRANEAN ZONES

CROSS-REFERENCE TO RELATED APPLICATION

This application is a continuation-in-part of application Ser. No. 09/696,902 filed on Oct. 25, 2000, now U.S. Pat. No. 6,367,550.

BACKGROUND OF THE INVENTION

1. Field of the Invention

The present invention relates to foamed fracturing fluids, additives for foaming the fracturing fluids and methods of using the fracturing fluids.

2. Description of the Prior Art

Viscous gelled fracturing fluids are commonly utilized in the hydraulic fracturing of subterranean zones penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone. The fracturing fluid also carries particulate proppant material, e.g., graded sand, into the formed fractures. The proppant material is suspended in the viscous fracturing fluid so that the proppant material is deposited in the fractures when the viscous fracturing fluid is broken and recovered. The proppant material functions to prevent the fractures from closing whereby conductive channels are formed through which produced fluids can flow to the well bore.

After the viscous fracturing fluid has been pumped into a subterranean zone in a formation and fracturing of the zone has taken place, the fracturing fluid is removed from the formation to allow produced hydrocarbons to flow through the created fractures. Generally, the removal of the viscous fracturing fluid is accomplished by converting the fracturing fluid into a low viscosity fluid. This has been accomplished by adding a delayed breaker, i.e., a viscosity reducing agent, to the fracturing fluid prior to pumping it into the subterranean zone. Examples of delayed breakers that can be used include, but are not limited to, enzymes, acids and oxidizing agents.

In carrying out hydraulic fracturing, the fracturing fluids must often be lightweight to prevent excessive hydrostatic pressure from being exerted on subterranean formations penetrated by the well bore. As a result, a variety of lightweight fracturing fluids have heretofore been developed and used including foamed fracturing fluids.

Foamed fracturing fluids have heretofore included various surfactants known as foaming and foam stabilizing agents for facilitating the foaming and stabilization of the foam produced when a gas is mixed with the fracturing fluid. However, the foaming and stabilizing surfactants have not met complete environmental requirements. That is, when the foaming and stabilizing surfactants find their way into water in the environment, they do not fully degrade which can result in interference with aquatic life cycles.

Thus, there are needs for improved foamed fracturing fluids, improved fracturing fluid foaming and stabilizing additives which degrade completely in the environment and are harmless thereto and improved methods of utilizing the foamed fracturing fluids.

SUMMARY OF THE INVENTION

The present invention provides improved foamed fracturing fluids, improved foaming additives for foaming and stabilizing the fracturing fluids which are harmless to the environment and methods of using the improved foamed fracturing fluids which meet the needs described above and overcome the deficiencies of the prior art. The improved foamed fracturing fluids for forming fractures in subterranean zones are basically comprised of water, a gelling agent for forming the water into gelled water and increasing the viscosity thereof, sufficient gas to form a foam and an effective amount of an environmentally harmless additive for foaming and stabilizing the gelled water comprised of hydrolyzed keratin.

The gelled water fracturing fluid foaming and stabilizing additive of this invention which is harmless to the environment is hydrolyzed keratin. The additive is preferably pre-dissolved in water to form an aqueous solution which is added to a fracturing fluid to be foamed along with a gas for foaming the fracturing fluid.

The methods of the present invention for fracturing subterranean zones penetrated by well bores are basically comprised of the following steps. A foamed fracturing fluid comprised of water, a gelling agent for forming the water into gelled water and thereby increasing the viscosity of the water, sufficient gas to form a foam and an effective amount of an additive for foaming and stabilizing the gelled water comprised of hydrolyzed keratin. Thereafter, the subterranean zone is contacted with the foamed fracturing fluid under conditions effective to create at least one fracture therein.

The objects, features and advantages of the present invention will be readily apparent to those skilled in the art upon a reading of the description of preferred embodiments which follows.

DESCRIPTION OF PREFERRED EMBODIMENTS

The improved foamed fracturing fluids of this invention are useful for fracturing subterranean zones penetrated by well bores to increase the production of hydrocarbons therefrom. The foamed fracturing fluids are basically comprised of water, a gelling agent for forming the water into gelled water and increasing the viscosity thereof, sufficient gas to form a foam and an effective amount of an environment harmless additive for foaming and stabilizing the gelled water comprised of hydrolyzed keratin.

The water utilized for forming the foamed fracturing fluid of this invention can be fresh water or salt water. The term "salt water" is used herein to mean unsaturated salt solutions and saturated salt solutions including brines and seawater. The gelling agent is added to the water for forming the water into gelled water and increasing the viscosity thereof. A variety of gelling agents can be used including natural or derivatized polysaccharides which are soluble, dispersible or swellable in an aqueous liquid to yield viscosity to the aqueous liquid. One group, for example, of polysaccharides which are suitable for use in accordance with the present invention includes galactomannan gums such as gum arabic, gum ghatti, gum karaya, tamarind gum, tragacanth gum, guar gum, locust beam gum and the like. Modified gums such as carboxyalkyl derivatives, like carboxymethylguar and hydroxyalkyl derivatives, like hydroxypropylguar can also be employed. Doubly derivatized gums such as carboxymethylhydroxypropylguar can also be used.

Modified celluloses and derivatives thereof can also be employed as gelling agents in accordance with the present invention. Examples of water-soluble cellulose ethers which can be used include, but are not limited to, carboxymethylcellulose, carboxymethylhydroxyethylcellulose, hydroxyethylcellulose, methylhydroxypropylcellulose, methylcellulose, ethylcellulose, propylcellulose, ethylcarboxymethylcellulose, methylethylcellulose, hydroxypropylmethylcellulose and the like. Of these, hydroxyethylcellulose and carboxymethylhydroxyethylcellulose are preferred. The most preferred cellulose derivative is hydroxyethylcellulose grafted with vinyl phosphonic acid as described in U.S. Pat. No. 5,067,565 issued on Nov. 26, 1991 to Holtmyer et al., the disclosure of which is incorporated herein by reference.

Other gelling agents which can be used include, but are not limited to, biopolymers such as xanthan gum, welan gum and a biopolymer commercially available from Halliburton Energy Services of Duncan, Ok. under the tradename "Flo-Back™". Of these, xanthan biopolymer is preferred.

Additional gelling agents include water dispersible hydrophillic organic polymers having molecular weights greater than 100,000 such as polyacrylamide and polymethacrylamide wherein about 5% to about 75% of the carboxamides are hydrolyzed to carboxyl groups and a copolymer of about 5% to about 70% by weight acrylic acid or methacrylic acid copolymerized with acrylamide or methacrylamide. These water dispersible organic hydrophillic polymers can be cross-linked with a cross-linking composition comprising water, a zirconium compound having a valence of $4^+$, an alpha-hydroxy acid and an amine compound as more fully described in U.S. Pat. No. 4,524,829 issued to Hanlon et al. on Jun. 25, 1985 which is incorporated herein by reference.

Still other gelling agents which can be used include, but are not limited to, a chelated organic gelling agent comprised of a metal ion chelated water soluble polyalkylene imine, such as polyethylene or polypropylene imine, and a water soluble polymer capable of being cross-linked by the gelling agent. Such polymers capable of being cross-linked by the gelling agent include a terpolymer of an ethylenically unsaturated polar monomer, an ethylenically unsaturated ester and a monomer selected from 2-acrylamido-2-methylpropane sulfonic acid (AMPS®) or N-vinylpyrrolidone or a tetrapolymer of an ethylenically unsaturated polar monomer, an ethylenically unsaturated ester, AMPS® and N-vinylpyrrolidone as more fully described in U.S. Pat. No. 6,196,317 B1 issued to Hardy on Mar. 6, 2001 which is incorporated herein by reference. Polymerizable water soluble monomers such as acrylic acid, methacrylic acid, acrylamide, methacrylamide and the like cross-linked with a cross-linker selected from glycerol dimethacrylate, glycerol diacrylate and others can also be utilized as more fully described in U.S. Pat. No. 5,335,726 issued to Rodrigues on Aug. 9, 1994 which is incorporated herein by reference.

Of the foregoing gelling agents, a gelling agent selected from the group consisting of galactomannans, cellulose derivatives and biopolymers are preferred. Of the galactomannans that can be utilized, guar, hydroxypropylguar and carboxymethylhydroxypropylguar are preferred. Of the cellulose derivatives that can be utilized, hydroxyethylcellulose, carboxymethylhydroxyethylcellulose and hydroxyethylcellulose grafted with vinyl phosphonic acid are preferred. Of the biopolymers which can be utilized, xanthan gum is preferred. The gelling agent utilized in the foamed fracturing fluid of this invention is generally included in the foamed fracturing fluid in an amount in the range of from about 0.125% to about 0.375% by weight of the water therein.

The gas utilized for forming the foamed fracturing fluid can be air or nitrogen, with nitrogen being preferred. The gas is present in an amount sufficient to foam the fracturing fluid, generally in an amount in the range of from about 20% to about 80% by volume of the water therein.

The environmentally harmless hydrolyzed keratin additive for foaming and stabilizing a gelled water fracturing fluid is manufactured by the base hydrolysis of hoof and horn meal. That is, the hoof and horn meal is heated with lime in an autoclave to produce a hydrolyzed protein. The protein is commercially available as a free-flowing powder that contains about 85% protein. The non-protein portion of the powder consists of about 0.58% insoluble material with the remainder being soluble non-protein materials primarily made up of calcium sulfate, magnesium sulfate and potassium sulfate.

The hydrolyzed keratin protein powder is preferably predissolved in fresh water in an amount of about 40% by weight of the solution. In addition to water for dissolving the hydrolyzed keratin, the additive can include other components such as one or more freezing and pour point depressants to prevent it from freezing during storage or handling in cold weather and lower its pour point. Preferably, such depressants are selected from the group of propylene glycol, sodium chloride and mixtures thereof. The depressant or depressants utilized are generally present in the additive solution in an amount in the range of from about 0.1% to about 0.125% by weight of the solution.

The hydrolyzed keratin in a 40% by weight aqueous solution is preferably included in a foamed fracturing fluid of this invention in an amount in the range of from about 0.2% to about 1.0% by volume of water in the foamed fracturing fluid.

In order to further enhance the development of the viscosity of the gelled water in the foamed fracturing fluid of this invention, the gelling agent utilized can be cross-linked by a cross-linking agent added to the gelled water. The cross-linking agent can comprise a borate releasing compound or any of the well known transition metal ions which are capable of creating a cross-linked structure with the particular gelling agent utilized. Preferred cross-linking agents for use with the above described gelling agents include, but are not limited to, borate releasing compounds, a source of zirconium IV ions, a source of titanium IV ions, a source of aluminum ions and a source of antimony ions. When used, the cross-linking agent is included in the gelled water in an amount in the range of from about 0.001% to about 0.1% by weight of the gelling agent therein.

When it is desirable to increase the viscosity and stability of a foamed fracturing fluid of this invention even further, a foam viscosity and stability increasing additive can be included in the foamed fracturing fluid. Examples of such foam viscosity and stability increasing additives include, but are not limited to, iodine, hydrogen peroxide, cupric sulfate and zinc bromide.

As mentioned, the foamed fracturing fluid can also include a proppant material for preventing formed fractures from closing. A variety of proppant materials can be utilized including, but not limited to, resin coated or un-coated sand, sintered bauxite, ceramic materials and glass beads. When included, the proppant material is generally present in the foamed fracturing fluid in an amount in the range of from about 1 to about 10 pounds of proppant material per gallon of the foamed fracturing fluid.

The methods of the present invention for fracturing a subterranean zone penetrated by a well bore are basically comprised of the following steps. A foamed fracturing fluid comprised of water, a gelling agent for forming the water into gelled water and thereby increasing the viscosity of the water, sufficient gas to form a foam and an effective amount of an additive for foaming and stabilizing the gelled water comprised of hydrolyzed keratin. Thereafter, the subterranean zone is contacted with the foamed fracturing fluid under conditions effective to create at least one fracture therein.

A preferred foamed fracturing fluid of this invention for forming fractures in a subterranean zone comprises: water; a gelling agent selected from the group consisting of galactomannans, cellulose derivatives and biopolymers for forming the water into gelled water and increasing the viscosity thereof, sufficient nitrogen to form a foam and an effective amount of an additive for foaming and stabilizing the gelled water comprised of hydrolyzed keratin.

A preferred method of this invention for fracturing a subterranean zone penetrated by a well bore comprises the steps of: (a) preparing a foamed fracturing fluid comprised of water, a gelling agent selected from the group consisting of galactomannans, cellulose derivatives and biopolymers for forming the water into gelled water and thereby increasing the viscosity of the water, sufficient nitrogen to form a foam and an effective amount of an additive for foaming and stabilizing the gelled water comprised of hydrolyzed keratin; and (b) contacting the subterranean zone with the foamed fracturing fluid under conditions effective to create at least one fracture therein.

In order to further illustrate the improved foamed fracturing fluids, additives and methods of this invention, the following examples are given.

EXAMPLE 1

One liter of tap water was placed in a Waring blender and 2% potassium chloride was added. 2.4 grams of hydroxypropyl guar (20 pounds per 1000 gallons) were stirred into the 2% potassium chloride solution. The solution was adjusted to a pH of 6.0 by the addition of sodium diacetate. The solution was stirred vigorously for 20 minutes to allow the guar to hydrate fully. The gel yielded a viscosity of 12 centipoises at 300 rpm on a Fann model 35 viscometer.

100 milliliters of the hydrated gel were placed in a Waring blender jar. 0.5 milliliters of keratin foaming agent were added to the blender jar at a very low blender speed to give the foam sufficient time to build. The speed of the blender and the shear rate were increased until the foam reached a maximum height in the blender jar. 60 grams of $20/40$ sand (5 pounds per gallon) were added to the blender jar with stirring to equally disperse the sand throughout the foam.

The resulting 70 quality foam was poured into a 500 milliliter graduated cylinder so that settling of the sand could be observed. Approximately 5% of the $20/40$ sand settled after one hour at room temperature. Stated another way, 95% of the $20/40$ sand stayed suspended in the foam for one hour.

EXAMPLE 2

One liter of tap water was placed in a Waring blender and 2% potassium chloride was added. 2.4 grams of hydroxypropyl guar (220 pounds per 1000 gallons) were stirred into the 2% potassium chloride solution. The solution was adjusted to a pH of 6.0 by the addition of sodium diacetate. The solution was stirred vigorously for 20 minutes to allow the guar to hydrate fully. The gel yielded a viscosity of 12 centipoises at 300 rpm on a Fann model 35 viscometer.

A solution of 10 milliliters of tap water, a foam stabilizer comprised of 2 grams of potassium iodine and 1.66 grams of iodine was prepared. 100 milliliters of the above described hydrated gel were placed in a Waring blender jar and stirring was started. 0.5 milliliters of the above described foam stabilizer were added and allowed to disperse followed by the addition of 0.5 milliliters of keratin foaming agent added at a very low blender speed to give the foam sufficient time to build. The mixing and the shear rate were increased until the foam reached the maximum height in the blender jar. 60 grams of $20/40$ sand were added while stirring to allow the sand to be equally dispersed throughout the foam.

The resulting 70 quality foam containing the dispersed sand was poured into a 500 milliliter graduated cylinder to observe sand settling. Trace quantities of the $20/40$ sand settled after one hour at room temperature. Stated another way, greater than 99% of the $20/40$ sand stayed suspended in the foam for one hour.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of fracturing a subterranean zone penetrated by a well bore comprising the steps of:
   (a) preparing a foamed fracturing fluid comprised of water, a gelling agent for forming said water into gelled water and thereby increasing the viscosity of said water, sufficient gas to form a foam and an effective amount of an additive for foaming and stabilizing said gelled water comprised of hydrolyzed keratin; and
   (b) contacting said subterranean zone with said foamed fracturing fluid under conditions effective to create at least one fracture therein.

2. The method of claim 1 wherein said water in said foamed fracturing fluid is selected from the group consisting of fresh water and salt water.

3. The method of claim 1 wherein said gelling agent in said foamed fracturing fluid is selected from the group consisting of galactomannans, cellulose derivatives and biopolymers.

4. The method of claim 1 wherein said gelling agent in said foamed fracturing fluid is a galactomannan selected from the group consisting of guar, hydroxypropylguar and carboxymethylhydroxypropylguar.

5. The method of claim 1 wherein said gelling agent in said foamed fracturing fluid is a cellulose derivative selected from the group consisting of hydroxyethylcellulose, carboxymethylhydroxyethylcellulose and hydroxyethylcellulose grafted with vinyl phosphonic acid.

6. The method of claim 1 wherein said gelling agent in said foamed fracturing fluid is xanthan gum.

7. The method of claim 1 wherein said gelling agent in said foamed fracturing fluid is present in an amount in the range of from about 0.125% to about 0.375% by weight of said water therein.

8. The method of claim 1 wherein said gas in said foamed fracturing fluid is selected from the group of air and nitrogen.

9. The method of claim 1 wherein said gas in said foamed fracturing fluid is present in an amount in the range of from about 20% to about 80% by volume of water therein.

10. The method of claim 1, wherein said hydrolyzed keratin in a 40% by weight aqueous solution is present in said foamed fracturing fluid in an amount in the range of from about 0.2% to about 1.0% by volume of water therein.

11. The method of claim 1 wherein said foamed fracturing fluid further comprises a cross-linking agent for cross-linking said gelled water.

12. The method of claim 11 wherein said cross-linking agent in said foamed fracturing fluid is selected from the group consisting of boron compounds and compounds that can supply zirconium IV ions, titanium IV ions, aluminum ions and antimony ions.

13. The method of claim 11, wherein said cross-linking agent in said foamed fracturing fluid is present in an amount in the range of from about 0.001% to about 0.1% by weight of said gelling agent therein.

14. The method of claim 1 wherein said foamed fracturing fluid further comprises a foam viscosity and stability increasing additive selected from the group consisting of iodine, hydrogen peroxide, cupric sulfate and zinc bromide.

15. The method of claim 1 wherein said foamed fracturing fluid further comprises proppant material.

16. The method of claim 15 wherein said proppant material is selected from the group consisting of resin coated or uncoated sand, sintered bauxite, ceramic materials and glass beads.

17. The method of claim 16 wherein said proppant material in said foamed fracturing fluid is present in an amount in the range of from about 1 to about 10 pounds of proppant material per gallon of said foamed fracturing fluid.

* * * * *